Dec. 11, 1962     H. H. KEELING ETAL     3,068,430
ISOLATOR WITH HOUSING
Filed Dec. 23, 1960
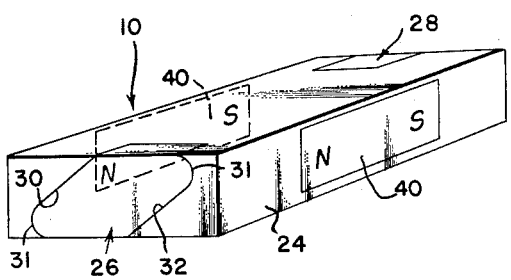
Fig. 1.
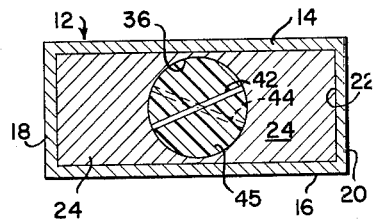
Fig. 2.
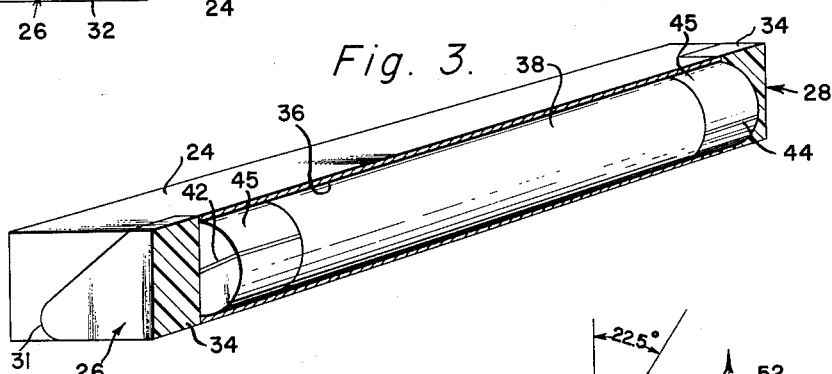
Fig. 3.
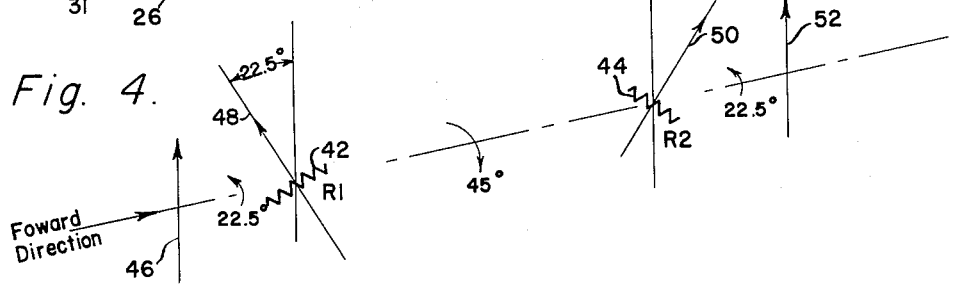
Fig. 4.
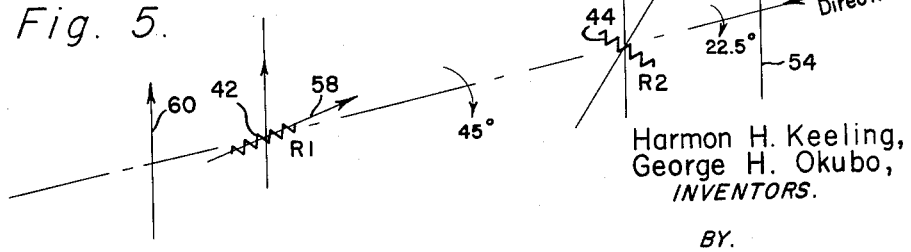
Fig. 5.
Harmon H. Keeling,
George H. Okubo,
INVENTORS.
BY.
ATTORNEY.

United States Patent Office 3,068,430
Patented Dec. 11, 1962

3,068,430
ISOLATOR WITH HOUSING
Harmon H. Keeling and George H. Okubo, Los Angeles, Calif., assignors to Hughes Aircraft Company, Culver City, Calif., a corporation of Delaware
Filed Dec. 23, 1960, Ser. No. 77,885
1 Claim. (Cl. 333—24.2)

The present invention relates to microwave devices and more particularly to a nonreciprocal isolator adapted to be used in a microwave transmission means to permit the passage of electromagnetic energy therethrough in one direction and to prevent the passage of such energy in the opposite direction.

The various components in a microwave system such as a transmitter, receiver and/or antenna are normally interconnected with each other by common transmission means such as hollow waveguides. Such waveguides and the related components are generally of a reciprocal nature whereby the energy may be propagated therethrough in either direction with equal facility. However, it is frequently necessary to permit the energy to be free to travel from a first component to a second component without permitting the transfer of energy in the reverse direction; i.e., from the second component to the first component. For example, the power out of the transmitter should not be permitted to enter the receiver. Accordingly, in such instances it has been necessary to provide a nonreciprocal device such as an isolator in the transmission means. Such an isolator must be capable of permitting energy to flow therethrough in the forward direction with a minimum energy loss. However, at the same time the isolator must prevent the energy flowing therethrough in the reverse direction by absorbing a maximum amount of the reversely flowing energy.

In the past, numerous isolators have been provided that satisfy the foregoing requirements. For applications, the most efficient types are those employing a gyroresonant member for absorbing the electromagnetic energy. Such a member normally consists of a ferrite material and is biased to produce a gyroresonant absorption effect to reversely flowing energy. In isolators of this nature, the frequencies at which energy is absorbed is determined by the density of the biasing flux. As a result, in the foregoing isolators it has been necessary to employ very large magnets particularly at the higher frequencies. Although the prior isolators may have provided satisfactory operating results, they have been bulky and expensive to manufacture.

In addition, it has previously been necessary for the isolator to be embodied in a large size structure that is located in the transmission system at thte junction or interconnection of two waveguides. As a result, the dimensions of the isolator enter into the over-all length of the transmission system. This makes it very difficult, if not impossible, to add or install such an isolator in an already existing transmission system without extensive modification to, or replacement of, one or more of the waveguides.

It is therefore an object of the present invention to provide an isolator which is not only compact, efficient and economical to manufacture, but may also be installed in a waveguide transmission system with a minimum amount of alteration to the system.

It is also an object to provide an isolator which will provide a minimum amount of loss to electromagnetic energy traveling therethrough in the forward direction but will also be effective over a wide band of frequencies to provide a maximum amount of isolation to electromagnetic energy traveling therethrough in the reverse direction.

These and other objects are to be accomplished in accordance with the present invention by providing an isolator that is incorporated into a housing comprising a conductive material and having exterior dimensions that correspond to the interior dimensions of the waveguide into which it is to be employed. As a result, the housing may be fitted into the interior of the waveguide and secured therein without necessitating any modification to the waveguide even though it may be incorporated into a pre-existing waveguide system.

In addition, the housing includes a secondary waveguide at each end that extends across the ends substantially diagonally thereof and a ferrite element that extends axially of the housing to interconnect the secondary waveguides. As electromagnetic energy enters the isolator with a vertical plane of polarization, the plane of polarization will be rotated by a predetermined amount due to the diagonal disposition of the secondary waveguide. The energy will then enter the ferrite and have the plane of polarization rotated again. Any energy still propagating through the isolator will then enter the remaining secondary waveguide and have the polarization thereof rotated back into a vertical position. Energy traveling in the forward direction will have the polarization rotated from the vertical position through a predetermined amount and then back into the vertical position with little or no attenuation. However, energy traveling in the reverse direction will be rotated so as to be absorbed by one or more resistive elements disposed in the isolator.

In the drawings:

FIG. 1 is a perspective view of an isolator embodying the present invention.

FIG. 2 is an end view of the isolator of FIG. 1 installed in a waveguide.

FIG. 3 is a perspective view of the isolator with portions thereof broken away.

FIGS. 4 and 5 are vector diagrams illustrating the planes of polarization of electromagnetic energy at various points in the isolator for different directions of propagation.

Referring to the drawings in more detail, the present invention is particularly adapted to be embodied in an isolator 10 for use in a microwave system. The present system includes waveguide 12 having a pair of parallel broad walls 14 and 16 and a pair of parallel narrow walls 18 and 20 that are arranged to form a rectangular passage 22 through which electromagnetic energy may be propagated.

The present isolator 10 comprises a housing 24 having a rectangular cross section that corresponds in size and shape to the interior dimensions of the waveguide 12. Thus the housing 24 will just fit into the passage 22 through the interior of a waveguide 12 without in any way necessitating the modification in the waveguide structure.

The housing 24 is preferably fabricated from a solid block of an electrically conductive material such as brass. Each end of the housing 24 has a "twist section" that is adapted to rotate the plane of polarization as the electric field of the electromagnetic energy propagates therethrough. Although this twist section may be of any of the reciprocal variety, in the present instance each of the sections includes a secondary waveguide 26 and 28. Each of the sections is formed in the end of the housing 24 by some suitable means such as milling. Each secondary waveguide 26 or 28 will extend substantially diagonally across the end and have a pair of broad walls 30 and 32. Although each broad wall 30 and 32 may have a curved portion 31 adjacent the ends, the walls are primarily plane surfaces that are substantially parallel to each other and spaced apart so that electromagnetic energy may be propagated therebetween in a direction axially of said housing 24. If desired, a member 34 consisting of a material having a dielectric constant of approximately 3, for example Stycast, may be disposed in the space between the broad walls 30 and 32.

It should be noted that if the energy in the primary waveguide is propagating in a mode that is vertically polarized, i.e. (the electrical field is normal to the broad walls 14 and 16, the plane of polarization in the secondary waveguides 26 and 28 will be angularly disposed with respect thereto as a result of the electric fields endeavoring to become normal to the broad walls 30 and 32. However, due to the short lengths of the waveguides 26 and 28 and the relative dispositions of the walls 14—16 and 30—32, the polarization will not rotate to the full amount of the inclination of the waveguides 26 or 28 but by a lesser amount. In the present instance, the angle is substantially equal to 22.5°. The reason for this angle will become apparent in connection with the explanation of the operation.

In order to transmit energy between the two secondary waveguides, a cylindrical passage 36 is provided that extends axially through the housing 24. This passage 36 is preferably a cylinder of uniform diameter such as might be formed by drilling. A ferrite element 38 is disposed in this passage 36 and a pair of permanent magnets 40 may be disposed on the opposite sides of the isolator 10 and poled as indicated in FIG. 1, whereby a steady D.C. magnetic longitudinal axial field will be produced through the ferrite. When the electromagnetic energy propagates through the ferrite, the electric field or plane of polarization will be rotated due to the so-called Faraday rotation effect. When the energy is traveling through the isolator in the forward direction, the rotation will rotate through 45° in a clockwise direction (looking in the direction of propagation). When the energy is propagating therethrough in the reverse direction, the plane of polarization will rotate in the same amount; i.e., 45° in a clockwise direction (looking in the same direction). It may be seen that the energy will always be rotated in the same direction.

A power absorbing device such as a resistive card 42 and 44 may be disposed at each end of the ferrite immediately adjacent the secondary waveguides 26 and 28. Each card 42 and 44 may be mounted in a dielectric plug 45 of a material such as Teflon. Each card is preferably substantially parallel to the broad walls 30 and 32.

In order to employ the present invention, the isolator 10 is inserted into the passage 22 through the waveguide 12 and secured in position therein by any suitable means. It should be noted that the isolator 10 may be placed in the waveguide 12 without modifying the waveguide length or necessarily being secured to the mounting flanges on the ends of the waveguide 12.

When electromagnetic energy is being propagated through the primary waveguide 12 it will preferably be in a mode wherein the energy is vertically polarized. In other words, the electric field will be normal to the broad walls as represented by the vector arrow 46. When the forwardly propagating energy arrives at the front end of the isolator 10, it will enter and propagate axially through the dielectric material 34 in the secondary waveguide 26. Since the electric vector must tend to become normal to the conductive surfaces of the broad walls 30 and 32, the electric field will be rotated from the vertical posiiton. In the present instance this angle of inclination is equal to substantially one-half of the amount of rotation in the ferrite member 38, or approximately 22.5°. Thus, when the energy enters the auxiliary waveguide 26, the energy will be rotated 22.5° counterclockwise (looking in the direction of propagation) as indicated by vector 48.

The rotated energy will then propagate through the dielectric plug 45 and across the resistive card 42. Since the card 42 is substantially parallel to the broad walls 30 and 32, the electric field will be perpendicular to the card 42 and there will be little or no loss of the electromagnetic energy into the card 42. Consequently, energy will propagate across the card 42 and into the ferrite cylinder 38 and axially thereof. As the energy traverses axially of the ferrite cylinder 38, it will be subject to the so-called Faraday effect. In the present instance the biasing magnetic field and the length of the ferrite are sufficient to produce a 45° rotation of the plane of polarization in a clockwise direction (looking in the direction of propagation). Thus, when the forwardly propagating energy emerges from the ferrite cylinder 38, the field will be inclined 22.5° as represented by the vector 50. The field will thus be substantially perpendicular to the card 44 and, consequently, there will be little or no loss as the energy propagates across the card 44. The energy will then propagate into and through the secondary waveguide 28 and emerge into the primary waveguide 12. In the process of doing so, the polarization will be rotated back 22.5° and will thus be normal to the broad walls as indicated by vector 52. It may thus be seen that energy propagating forwardly through the waveguide 12 will pass through the isolator 10 with little or no attenuation.

When the energy is being propagated in the opposite or reverse direction, the electromagnetic energy will be vertically polarized as represented by vector 54. Upon entering the auxiliary waveguide 28 the energy will be rotated approximately 22.5° in the counter-clockwise direction (looking in the direction of reverse propagation). This rotated energy will be inclined as shown by vector 56 when it enters into the ferrite cylinder 38. As the energy traverses the ferrite cylinder 38 it will be rotated approximately 45° in the same counter-clockwise direction. Thus, the reversely propagating energy leaving the ferrite cylinder 38 will have been rotated a total of 67.5°. As this energy emerges from the ferrite cylinder 38 it will propagate through the Teflon plug 45 and pass over the second resistive card 42. Since this card is disposed at 22.5° to the board walls 30 and 32 of the secondary waveguide 26, this energy will have the electric field thereof substantially parallel to the electric card 42. As a consequence, substantially all of the energy will be absorbed in the card 42 and little or no energy will emerge from the opposite end of the isolator 10.

What is claimed is:

In a waveguide system including, input waveguide means for propagating plane polarized wave energy, output waveguide means, an isolator means comprising in combination: a rectangular waveguide having major and minor axes and interconnecting said input and output waveguides and forming a continuous integral waveguide therewith of uniform dimensions, first reciprocal means immediately adjacent said input waveguide means for propagating wave energy having a predetermined polarization at an angle to the major axis of said waveguide, a resistor card adjacent said reciprocal means and lying in a plane oriented at said angle with respect to said major axis, a ferrite section adjacent said resistor card comprising a substantially cylindrical ferrite rod of predetermined diameter less than the dimension of the minor axis of said rectangular waveguide, permanent magnet means magnetically coupled to said rod for rotating the plane of polarization of said propagated wave energy, a second resistor card and second reciprocal means adjacent said ferrite rod for propagating wave energy having a predetermined polarization at an angle to the major axis of said waveguide equal to said first named angle but rotated in a direction opposite to said first named angle from said major axis, said second reciprocal means being disposed immediately adjacent said output waveguide means, and a housing substantially filling said rectangular waveguide and supporting said first and second reciprocal means, resistor cards, ferrite rod and permanent magnet means.

References Cited in the file of this patent

UNITED STATES PATENTS

| | | |
|---|---|---|
| 2,743,322 | Pierce et al. | Apr. 24, 1956 |
| 2,802,183 | Read | Aug. 6, 1957 |
| 2,906,974 | Reggia et al. | Sept. 29, 1959 |
| 2,941,168 | Caswell | June 14, 1960 |
| 2,989,709 | Seidel et al. | June 20, 1961 |

OTHER REFERENCES

Karayianis et al.: "Proceedings of the IRE," October 1956, pages 1414–1421 (page 1416 relied on).